United States Patent [19]
Krohm

[11] 3,848,729
[45] Nov. 19, 1974

[54] SCRAPER CONVEYOR
[75] Inventor: Reinold Krohm, Herne, Germany
[73] Assignee: Klockner-Werke AG, Duisburg, Germany
[22] Filed: May 8, 1973
[21] Appl. No.: 358,418

[30] Foreign Application Priority Data
May 9, 1972 Germany............................ 2222650

[52] U.S. Cl.................. 198/171, 198/137, 198/204
[51] Int. Cl............................................. B65g 19/22
[58] Field of Search .......... 198/171, 172, 173, 137, 198/204

[56] References Cited
UNITED STATES PATENTS
1,917,134  7/1933  Levin................................. 198/204

Primary Examiner—Evon C. Blunk
Assistant Examiner—Jeffrey V. Nase
Attorney, Agent, or Firm—Michael S. Striker

[57] ABSTRACT

A pair of transversely spaced parallel guide rails define an upper and a lower conveyor run for a chain of scraper elements which extend transversely to the elongation of the guide rails and have end portions received in the respective rails. Since the end portions occasionally jump out of the rails so that the respectively involved scraper element is then no longer guided in the rails, a restoring arrangement is provided which will automatically return the end portions of such a scraper element into the rails in response to movement of the scraper element involved along the lower conveyor run.

22 Claims, 20 Drawing Figures

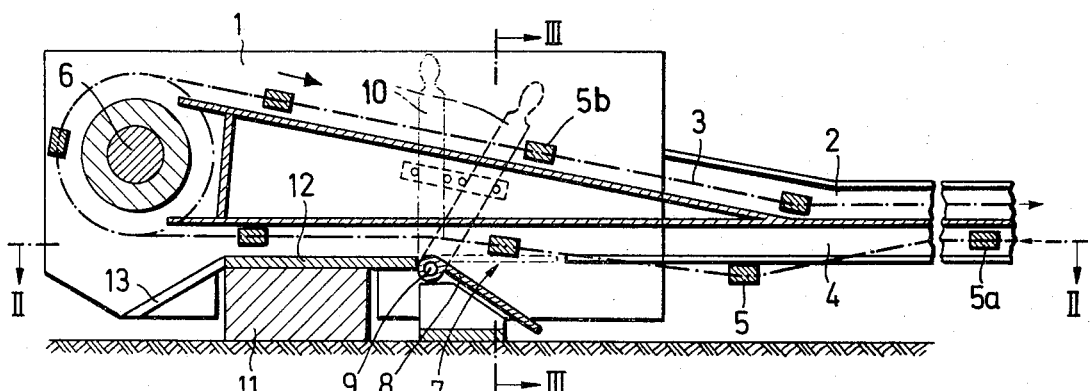
FIG. 1
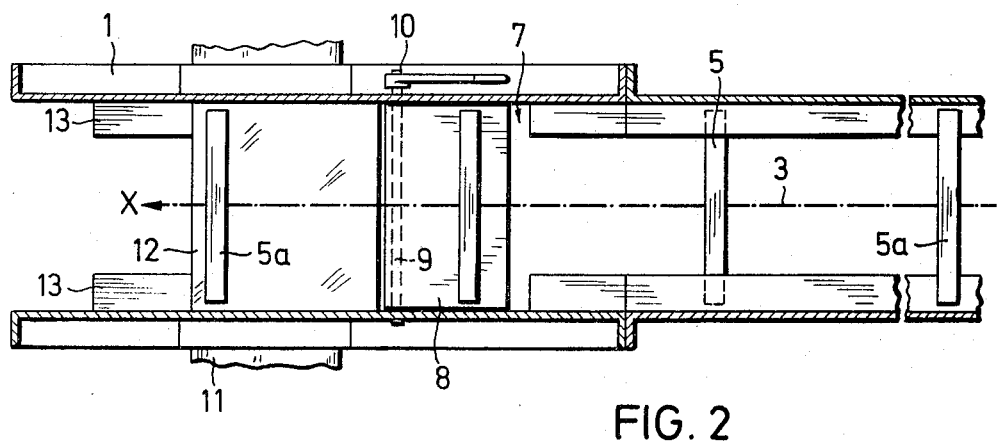
FIG. 2
FIG. 3

SCRAPER CONVEYOR

BACKGROUND OF THE INVENTION

The present invention relates generally to a scraper conveyor, and more particularly to a scraper conveyor provided with an arrangement for restoring scraper elements which have jumped their guide tracks.

Scraper conveyors basically utilize two transversely spaced guide rails defining an upper and a lower run, and in which a chain of scraper elements is guided for movement in an endless path. Various different types of such scraper conveyors are known, but all of them have in common the fact that the scraper elements extend transversely between the rails and have end portions received in the respective rails so as to be guided thereby. The scraper elements are connected either by a chain which is located midway between the two rails, or by two or more chains which may be located in the region of the end portions of the scraper element adjacent the rails, or may be located elsewhere. In any case, all of these scraper conveyors are known to experience a problem which can lead to premature destruction of at least some components of the conveyor, namely the jumping of the end portions of respective scraper elements out of the guide rails. The scraper elements involved are then of course no longer properly guided and one result of this is the fact that the power requirements for the conveyor drive are then much higher than they would have to be otherwise. Frequently, the chains connecting the successive scraper elements together, will break and substantial expenses are then involved for repairs. Of course, such problems also result in the necessary shutting-down of the conveyor which is then not available for use.

SUMMARY OF THE INVENTION

Accordingly, it is a general object of the present invention to overcome the disadvantages of the prior art.

More particularly it is an object of the present invention to provide an improved scraper conveyor which is not possessed of these disadvantages.

Still more particularly it is an object of the present invention to provide an improved scraper conveyor which will automatically return scraper elements that have jumped the guiderails, back into the guiderails for guidance by the same.

An additional object of the invention is to provide such a scraper conveyor in which this automatic restoration of the track-jumping scraper elements will be effective, irrespective of the particular direction in which the chain of scraper elements advances.

Another object of the invention is to provide such a scraper conveyor in which the means for this automatic restoration does not in any way interfere with the operation of the conveyor, with its material throughput capacity, or with any other desirable feature.

In keeping with these objects, and others which will become apparent hereafter, one feature of the invention resides, in a scraper conveyor, in a combination which comprises a pair of transversely spaced parallel guide rails defining an upper and a lower conveyor run, and a chain of scraper elements arranged to move along the rails selectively in one or in an opposite direction. The scraper elements have opposite end portions engaged in the respective rails and at times subject to becoming disengaged therefrom. Restoring means is provided in the region of the lower run and is operative for restoring the end portions of respective disengaged scraper elements into the rails.

The present invention can readily be embodied in existing scrapper conveyors and requires no structural changes of such conveyors. It will provide for an automatic restoration of scraper elements which have jumped the guide rails, into the guide rails during the movement of the chain of scraper elements. istic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a vertical longitudinal section through a first embodiment of the invention;

FIG. 2 is a section taken on line II—II of FIG. 1;

FIG. 3 is a transverse section through FIG. 1;

DESCRIPTION OF THE PREFERRED EMBODIMENTS

Figure 4:
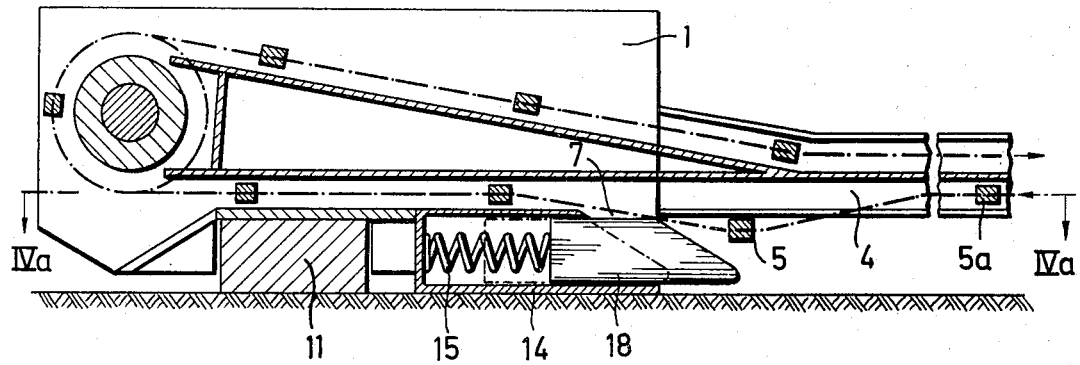
FIG. 4 is a vertical longitudinal section through a further embodiment of the invention.

Discussing now firstly the embodiment illustrated in FIGS. 1–3 it will be seen that reference numeral 1 diagrammatically identifies a frame of a scraper conveyor, being provided in the region of the opposite ends, of which only one is shown. A scraper trough 2 is diagrammatically shown, as is the scraper element chain 3 which is known per se. For orientation and information I have illustrated a properly guided scraper element 5a in the lower run of the conveyor, and a properly guided scraper element 5b in the upper run of the conveyor. I have also shown a scraper element 5 which has jumped the track, being suspended from the chain which connects the successive scraper elements together, but not having its end portions guided in the transversely spaced guide rails of the conveyor.

In the region of the lower run, adjacent the illustrated end portion of the conveyor, there is provided a restoring arrangement which will automatically restore the scraper element 5 to guidance of its end portions by the transversely spaced rails. In the particular embodiment the arrangement is located between the sprockets 6 and the trough 2 which is connected with the frame 1. Each of the rails is provided in the lower run with a cutout or break 7 which are exactly transversely opposite one another and of identical size. Each of these cutouts 7 has associated with it a ramp-shaped inclined guide element 8 whose length corresponds to the length of the cutout 7 and which is mounted so as to be pivotable about the transversely extending horizontal shaft 9, so that each element can be pivoted in vertical direction. At one or even both axial ends of the shaft 9 there is provided a setting lever 10 fixed with the shaft that the latter can be turned as the lever 10 is pivoted between the two broken-line positions shown in FIG. 1. This causes the guide element 8 to be pivoted up to the broken-line position of FIG. 1, or to be pivoted downwardly therefrom. Arresting means are diagrammatically illustrated, for arresting the lever 10 in the respective position thereof. The transverse width of each guide element 8 may be equal to the width of the rails, or it may extend over the entire width of the conveyor from one to the other rail.

The frame 1 in this embodiment is provided on a transverse support element 11 which is straddled and bridged by a substantially roof-shaped member 12 (or two, of which each one is associated with one of the rails 4) and the opposite end portions of which are inclined in the manner shown most clearly in FIG. 1. The end portion 13 located beneath the sprockets 6 is fixed, and the guide element 8 constitutes the other end portion, as shown in FIG. 1.

The scraper elements advance in the direction of the arrow x (see FIG. 2) and the element 5 which has jumped the tracks will in so doing reach the inclined guide element 8 which it contacts when the guide element 8 is in the full-line position of FIG. 1. On such contact, the element 5 will slide along upwardly over the guide element 8 and be returned through the cutouts 7 into the rails 4. If the direction of advancement of the chain is to be reversed, that is counter to the arrow x in FIG. 2, then the guide element 8 is pivoted to the broken-line position of FIG. 1, closing the cutouts 7.

Figure 4A:
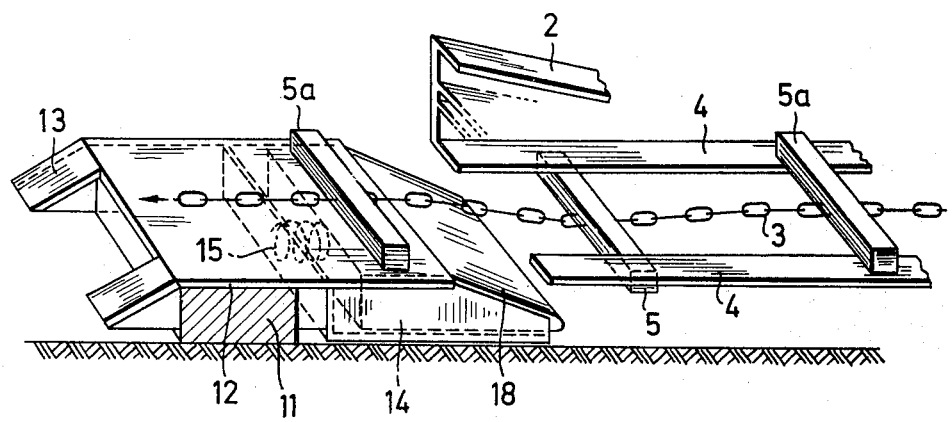
FIG. 4a is a fragmentary horizontal section taken on line IVa—IVa of FIG. 4.

In the embodiment shown in FIGS. 4 and 4a like reference numerals identify the same components as in the preceding embodiment. Here, however, the guide element is identified with reference numeral 18 and is shiftable, rather than pivotable. Here, again, a single guide element can be provided, or two guide elements in which case each is then associated with one of the rails 4. The single or the two guide elements are each provided with a housing 14 in which they can slide against the biasing force of a spring 15, or other biasing means such as a hydraulic cylinder and piston unit or the like. The scraper elements are in this embodiment connected to a center chain, as shown especially in FIG. 4a and it will be appreciated that when a scraper element 5 which has jumped the tracks comes into contact with the guide element or elements 18, it will shift the same to the left in FIG. 4 against the action of the spring 15, until the cutouts 7 are sufficiently opened for the scraper element to ride up on the inclined surfaces of the guide element or elements 18 and to thus reenter the tracks or rails 4.

Figure 5:
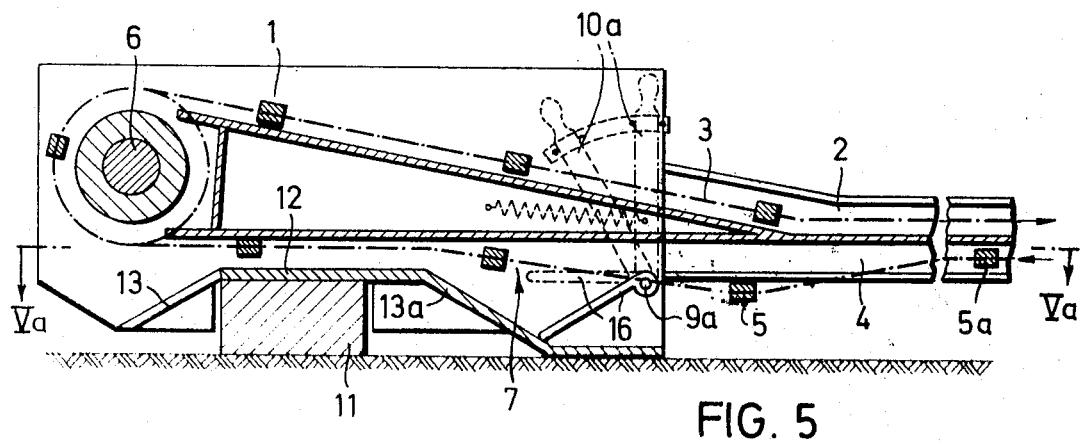
FIG. 5 is a vertical longitudinal section through a further embodiment of the invention.
Figure 5A:
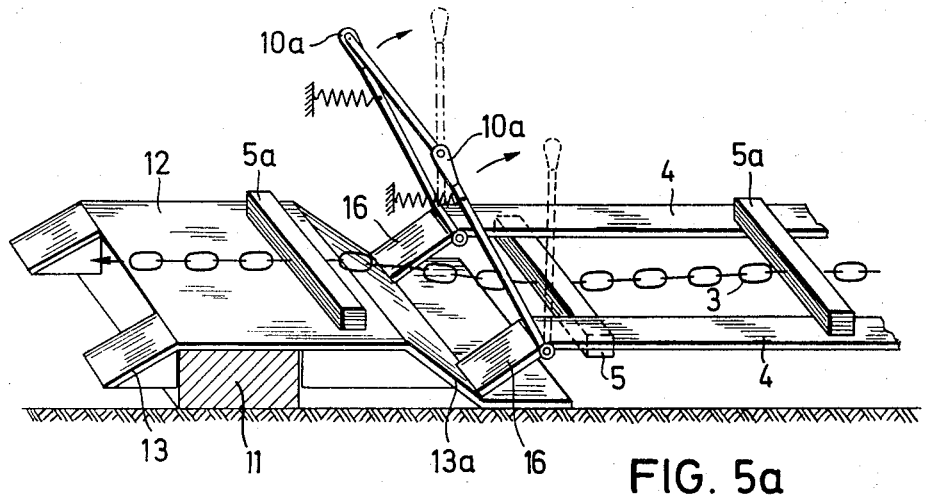
FIG. 5a is a fragmentary horizontal section taken on line Va—Va of FIG. 5.

In the embodiment of FIGS. 5 and 5a the guide element is identified with reference numeral 12 and again straddles the transverse member 11. It has a fixed upwardly inclined surface or end portion 13 and a further fixed upwardly inclined surface or end portion 13a, as well as a pivotable guide element 16 which is pivotable about a transverse horizontal axis 9a. The chain 3 which connects the scraper elements moves in the space located between the rails 4, and only the scraper element 5 which has jumped the tracks moves along and in contact with the undersides of the rails 4 until it comes to the guide element 16. The latter defines with the end portion 13a a downward depression and is arranged at an angle relative to it. The shaft defining the axis 9a can be turned by means of the lever 10a. When the element 16 is in the full-line position of FIG. 5, the scraper element 5 advancing towards the left in FIG. 5 will push it upwardly to the broken-line position so that the scraper element will move along the underside of the guide element 16 and through the cutout 7 back into the rail 4. In so doing it will move over the inclined surface of the end portion 13a, which causes it to reenter the rails 4. If the direction of advancement of the chain of scraper elements in reversed, then any scraper elements can at most dip into the depression defined between the guide element 16 and the end portion 13a and will ride up over the inclined surface of the guide element 16, to be restored to the rails 4. The lever 10a can be spring biassed to the left-hand position in FIG. 5, or it can be urged to this position in other ways, for instance by means of a weight. Arresting means may be provided for arresting it in either of the two illustrated positions of FIG. 5. Such a possibility has been illustrated in FIG. 5.

Figure 6:
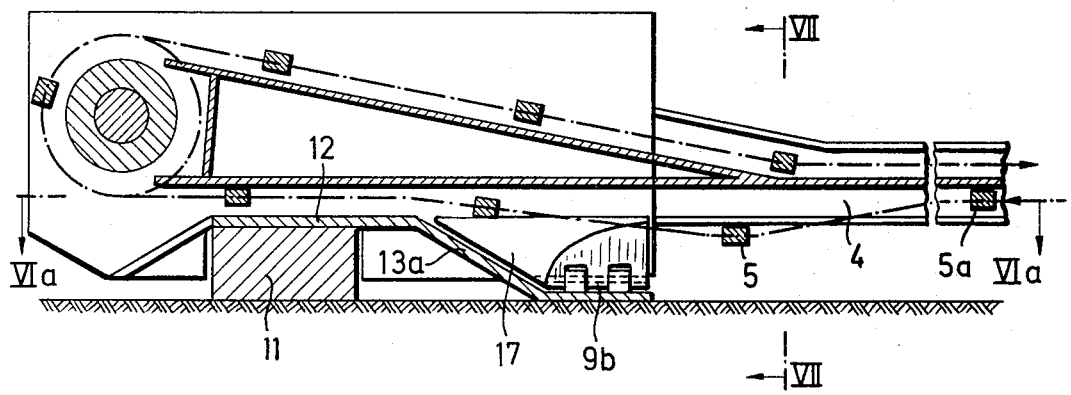
FIG. 6 is a vertical longitudinal section through another embodiment of the invention.
Figure 6A:
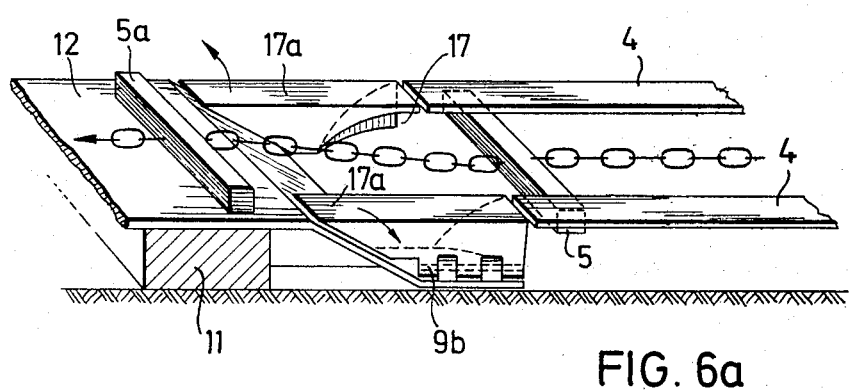
FIG. 6a is a fragmentary horizontal section taken on line VIa—VIa of FIG. 6.
Figure 6D:
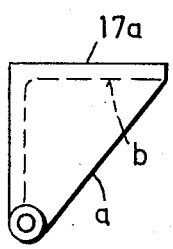
FIG. 6d is an end view of FIG. 6b, looking towards the right.
Figure 6B:
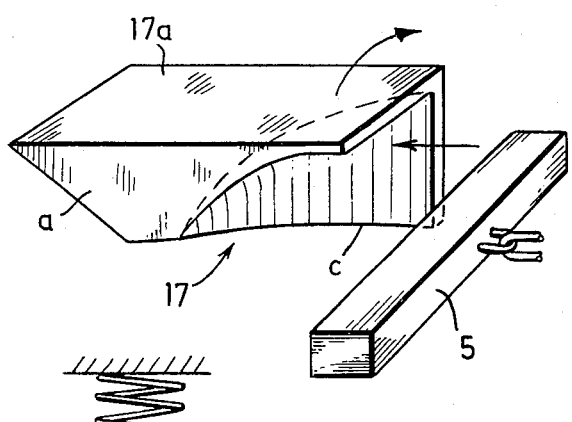
FIG. 6b is an enlarged perspective of a detail of FIG. 6.
Figure 6E:
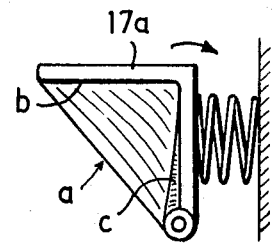
FIG. 6e is an end view of FIG. 6b, looking towards the left.
Figure 6C:
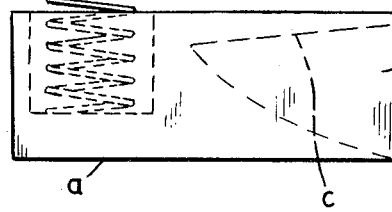
FIG. 6c is a top-plan view of FIG. 6b.
Figure 7:
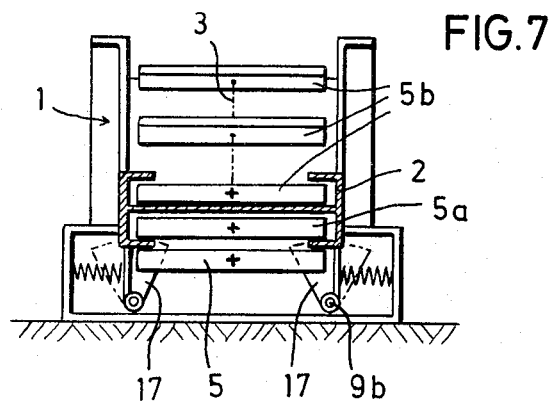
FIG. 7 is a cross-section of FIG. 6 taken on line VII—VII.

The embodiment in FIG. 6 and FIG. 7 utilizes guide elements 17 which are located in the region of the respective rails 4, extending longitudinally of the same. Each of these guide elements 17 is mounted as shown particularly clearly in FIGS. 6a- 6e and turnable about a horizontal shaft 9b which extends longitudinally of the respective rails 4. Thus, these guide elements 17 are turnable laterally relative to the elongation of the rails 4, and as shown in FIG. 7 they are spring biassed by springs located at their outwardly directed sides for which purpose housings may be provided in the frame or otherwise to hold the springs. Each of the guide elements 17 is provided with an inclined surface c and a further inclined surface b (see FIGS. 6b, 6d and 6e) and with an upper surface 17a which is normally located flush with the respective cutout 7. When the end portions of a scraper element 5 which has jumped the track come in contact with the surfaces b and c, they will displace the respective guide elements 17 about the shafts 9b in outward direction, counter to the biasing force of the associated springs. This causes the cutouts 7 to be opened and the end portions of the scraper element 5 ride up over the guide elements 17 and are restored through the cutouts 7 into the respective rails 4. When the scraper element 5 has passed, the guide elements 17 are restored to their usual position by the biasing springs. This takes place as soon as the scraper element 5 has reached the surface 12 of the frame 1.

Figure 8:
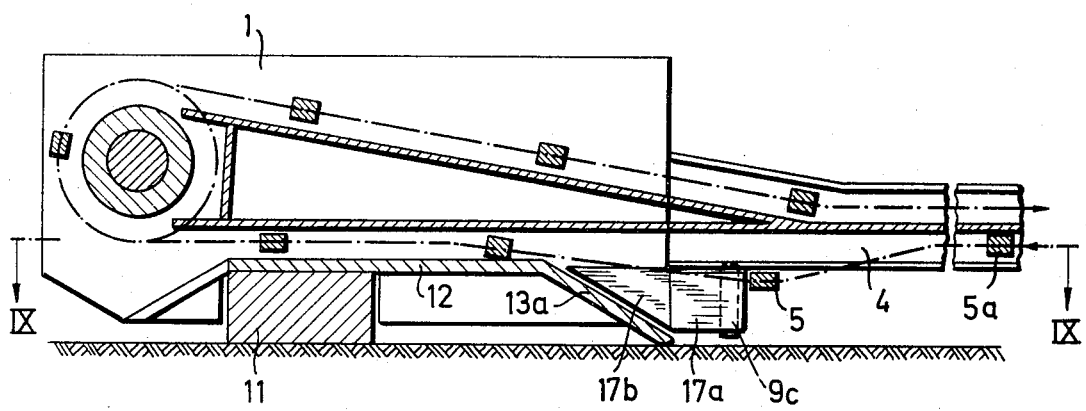
FIG. 8 is a vertical longitudinal section through still an additional embodiment of the invention.
Figure 9:
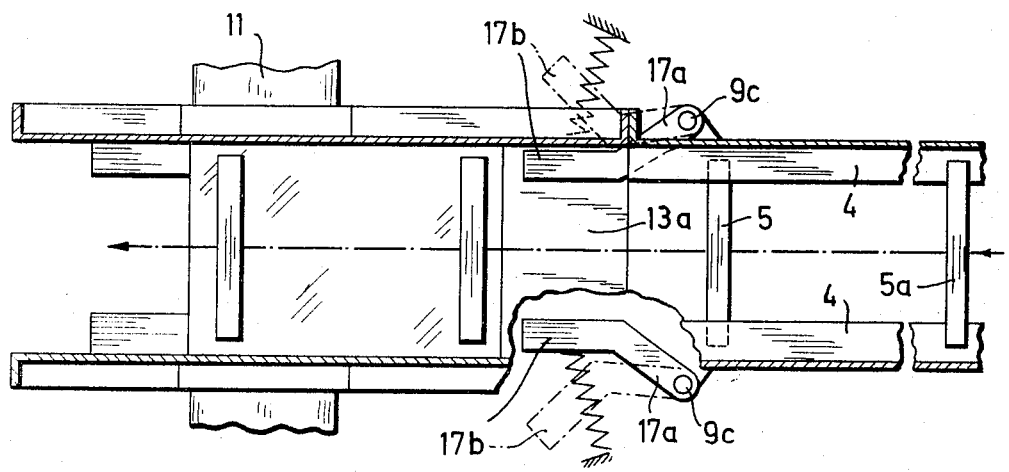
FIG. 9 is a horizontal section taken on line IX—IX of FIG. 8.

In the embodiment of FIGS. 8 and 9 the guide element is identified with reference numeral 12 and again straddles the transverse member 11. It has a fixed end portion 13a, and additional guide elements 17a are provided which are angled as shown in the enlarged portion of FIG. 9. One angle portion is provided with an inclined surface which is engaged by the oncoming scraper element 5 that has jumped the tracks, so that the scraper element 5 pivots the guide element 17a in outward direction about a vertical axis, with the result that the other angled portion 17b which heretofore has closed the cutouts 7 in the respective rails 4, now frees these cutouts, permitting the scraper element 5 which rides up on the guide element 17a to enter through the cutouts 7 into the rails. The guide elements 17a are spring biassed inwardly to the position in which the portion 17b normally closes the cutouts 7.

Figure 10:
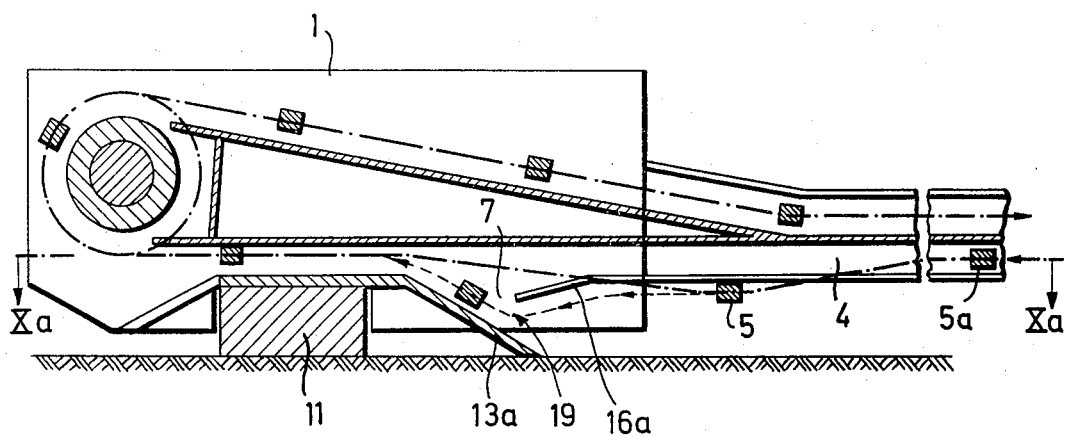
FIG. 10 is a vertical longitudinal section through another embodiment of the invention.
Figure 10A:
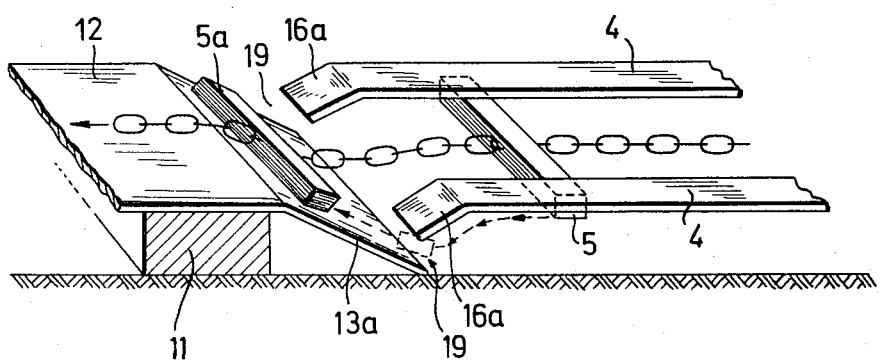
FIG. 10a is a fragmentary horizontal section taken on line Xa—Xa of FIG. 10.

In the embodiment of FIGS. 10 and 10a the inclined portions 13a are again provided, and in addition they are oppositely inclined to the guide elements 16a. The end portions 13a and guide elements 16a are inclined to different extends and their ends are so spaced from one another that they define a passage 19 through which an oncoming scraper element 5, which has previously jumped the rails, can pass upwardly into the cutouts 7 and back into the rails 4. The scraper element 5 of course slides with its ends along the underside of the lower guiderails 4 and is pushed downwardly in the manner shown in FIG. 10, so as to enter into and through the passage 19. The chain connecting the scraper elements moves midway between the rails 4. If the direction of advancement of the elements 5 is reversed, then the scraper elements are engaged by the inclined surface of the guide element 16a and made to enter into the rails 4. Advantageously the ends of the end portion 13a and the associated guide element 16a are overlapped with respect to a vertical plane passing through them.

Figure 11:
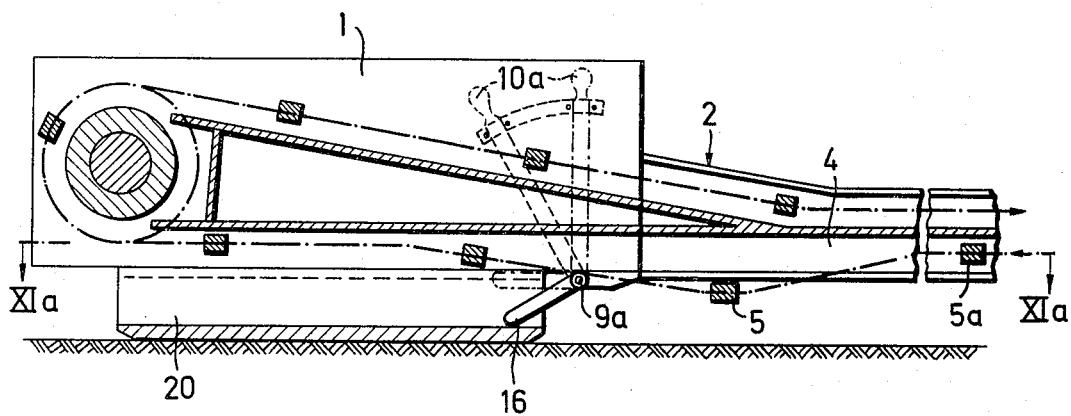
FIG. 11 is a vertical longitudinal section through still a further embodiment of the invention.
Figure 11A:
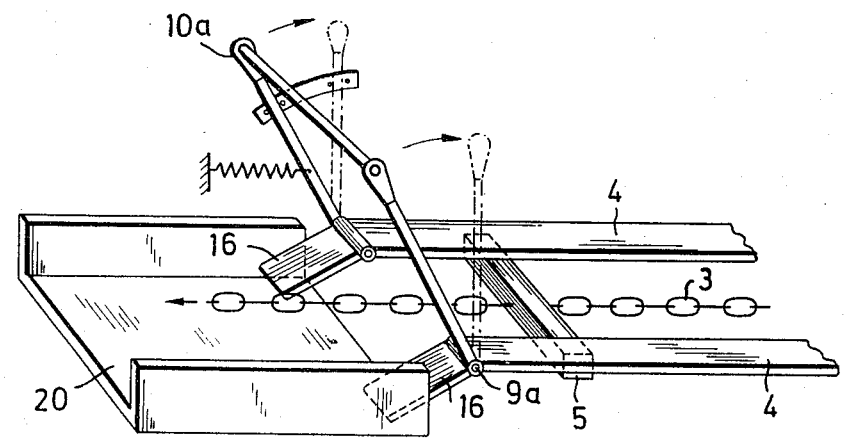
FIG. 11a is a fragmentary horizontal section taken on line XIa—XIa of FIG. 11.

Finally, the embodiment in FIGS. 11 and 11a provides a trough-shaped base 20 for the frame 1, which may actually be part of the frame so that the entire underside of the frame forms a large cutout or opening through which the scraper elements 5 can be restored into guidance by the rails 4. The guide elements are identified with reference numeral 16, and there are at least two of them provided which are vertically pivotable on respective transverse axis, each of which may be provided with a lever 10a. However, instead of two axes 9a there can be a joint single axis 9a. The levers 10a can be spring-biassed or arrestable, and the chain connecting the scraper elements again runs midway between the rails 4. If a scraper element 5 which has jumped the tracks slides along the other side of the lower rails 4, it contacts the guide element 16, displacing it and being guided by it back into engagement by the rails 4. If the direction of movement of the scraper elements is reversed, they will nevertheless be properly guided into the rails 4 if any of them have jumped the rails.

In all embodiments it is a particular advantage that any scraper element which has jumped the tracks will automatically be returned to guidance by the rails 4 before it reaches the chain sprockets 6. It will be appreciated that if it is desired the restoring arrangement can be constructed as a self-contained unit on which the machine frame can be placed and to which the machine frame can be secured. However, equally clearly in any of the embodiments disclosed herein the restoring arrangement can be made as a part of the machine frame rather than being a self-contained unit.

It will be understood that each of the elements described above, or two or more together, may also find a useful application in other types of constructions differing from the types described above.

While the invention has been illustrated and described as embodied in a scraper conveyor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a scraper conveyor, a combination comprising a pair of transversely spaced parallel guide rails defining an upper and a lower conveyor run, said rails having cutouts at said lower run; a chain of scraper elements; means for moving said scraper elements along said rails selectively in one and in an opposite direction, said scraper elements having opposite end portions engaged in the respective rails and at times subject to becoming disengaged therefrom; and restoring means comprising guide element means having pivotable flaps which are arranged to be contacted by disengaged scraper elements and to guide the end portions thereof into said cutouts, thereby restoring the end portions of the respective disengaged scraper elements into said rails.

2. In a scraper conveyor, a combination comprising a pair of transversely spaced parallel guide rails defining an upper and a lower conveyor run, said rails having cutouts at said lower run; means for moving a chain of scraper elements along said rails selectively in one and in an opposite direction, said scraper elements having opposite end portions engaged in the respective rails and at times subject to becoming disengaged therefrom; and restoring means comprising a single guide element extending from one to the other of said rails, said restoring means being positioned to be contacted by disengaged scraper elements to thereby guide the end portions thereof into said cutouts and thus onto said rails.

3. In a scraper conveyor, a combination comprising a pair of transversely spaced parallel guide rails defining an upper and a lower conveyor run, said rails having cutouts at said lower run; means for moving a chain of scraper elements along said rails selectively in one and in an opposite direction, said scraper elements having opposite end portions engaged in the respective rails and at times subject to becoming disengaged therefrom; and restoring means comprising guide element means movable between two positions in which said guide element means respectively blocks and unblocks said cutouts; said restoring means being so positioned as to be contacted by disengaged scraper elements and to guide the end portions thereof through said cutouts onto said rails; and arresting means for arresting said guide element means in at least one of said two positions.

4. A combination as defined in claim 3, and further comprising biasing means biasing said guide element means towards one of said two positions thereof.

5. In a scraper conveyor, a combination comprising a pair of transversely spaced parallel guide rails defining an upper and a lower conveyor run, said rails having cutouts at said lower run; means for moving a chain of scraper elements along said rails selectively in one and in an opposite direction, said scraper elements having opposite end portions engaged in the respective rails and at times subject to becoming disengaged therefrom; and restoring means comprising guide element means including two guide elements each movable to and from a position in which it is located flush within the respective cutout, said guide element means being positioned to be contacted by disengaged scraper elements and to guide the end portions thereof into said cutouts, thereby being operative for restoring the end portions of respective disengaged scraper elements onto said rails.

6. In a scraper conveyor, a combination comprising a pair of transversely spaced parallel guide rails defining an upper and a lower conveyor run; means for moving a chain of scraper elements along said rails selectively in one and in an opposite direction, said scraper elements having opposite end portions engaged in the respective rails and at times subject to becoming disengaged therefrom; restoring means in the region of said lower run and operative for restoring the end portions of respective disengaged scraper elements onto said rails; and a frame on which said rails are mounted, including a transverse member beneath said lower run, said restoring means comprising roof-shaped ramps straddling said transverse member beneath said rail, and each having upwardly and mutually oppositely inclined guide portions located at opposite sides of said transverse member.

7. A combination as defined in claim 6, wherein one guide portion of each ramp is movable relative to the associated rail.

8. A combination as defined in claim 6, wherein one guide portion of each ramp is pivotable about an axis extending transversely to the elongation of said rails.

9. In a scraper conveyor, a combination comprising a pair of transversely spaced parallel guide rails defining an upper and a lower conveyor run and having cutouts at said lower run; means for moving a chain of scraper elements along said rails selectively in one and in an opposite direction, said scraper elements having opposite end portions engaged in the respective rails and at times subject to becoming disengaged therefrom; and restoring means comprising a fixed and movable restoring member located beneath each of said cutouts in the region of said lower run and operative for restoring the end portions of respective disengaged scraper elements onto said rails.

10. A combination as defined in claim 9, wherein each fixed and movable restoring member are inclined to one another in direction downwardly of said lower run.

11. A combination as defined in claim 9, wherein said movable restoring members are pivotable about upright pivot axes.

12. A combination as defined in claim 11, wherein said movable restoring members have inclined surfaces so positioned as to be contacted by the end portions of disengaged scraper elements, and wherein said movable restoring members are laterally pivotable away from said cutouts in response to such contact.

13. A combination as defined in claim 9, wherein said movable restoring members are pivotable about horizontal axes which extend longitudinally of the respectively associated rail.

14. In a scraper conveyor, a combination comprising a plurality of transversely spaced parallel guide rails defining an upper and a lower conveyor run, said rails having cutouts at said lower run; means for removing a chain of scraper elements along said rails selectively in one and in an opposite direction, said scraper elements having opposite end portions engaging the respective rails and at times subject to becoming disengaged therefrom; and restoring means in the region of said lower run comprising restoring members for each rail, each restoring member having two portions which are mutually inclined at different angles and define between one another a passage so positioned as to permit entry of a scraper element end portion therethrough and into the associated cutout, thereby being operative for restoring the end portions of the respective disengaged scraper elements into said rails.

15. In a scraper conveyor, a combination comprising a plurality of transversely spaced parallel guide rails defining an upper and a lower conveyor run; means for moving a chain of scraper elements along said rails selectively in one and in an opposite direction, said scraper elements having opposite end portions engaged in the respective rails and at times subject to becoming disengaged therefrom; a frame on which said rails are mounted, and upwardly open trough-shaped base in which said frame is mounted; and restoring means in the region of said lower run comprising pivotable restoring members on said base and movable to and from a restoring position, thereby being operative for restoring the end portions of respective disengaged scraper elements onto said rails.

16. In a scraper conveyor, a combination comprising a pair of transversely spaced parallel guide rails defining an upper and a lower conveyor run, said rails having cutouts at said lower run; means for moving a chain of scraper elements along said rails selectively in one and in an opposite direction, said scraper elements having opposite end portions engaging the respective rails and at times subject to becoming disengaged therefrom; and restoring means, situated in the region of said lower run, comprising guide element means arranged to be contacted by disengaged scraper elements and to guide the end portions thereof into said cutouts, said guide element means being movable between two positions in which it respectively blocks and unblocks said cutouts.

17. A combination as defined in claim 16, wherein said rails have cutouts at said lower run; and wherein said restoring means comprises guide element means arranged to be contacted by disengaged scraper elements and guide the end portions thereof into said cutouts.

18. A combination as defined in claim 17, wherein said guide element means comprises slidable guide elements.

19. A combination as defined in claim 16; and further comprising a frame on which said rails are mounted.

20. A combination as defined in claim 16; further comprising a frame on which said rails are mounted; and wherein said restoring means is a fixed part of said frame.

21. A combination as defined in claim 16, wherein said restoring means is a self-contained unit; and further comprising a frame mounting said rails and being positioned and secured on said unit.

22. A combination as defined in claim 16, wherein said rails have cutouts at said lower run; and wherein said restoring means comprises restoring members movable into and out of said cutouts in dependence upon the direction of advancement of said scraper elements.

* * * * *